United States Patent

Brunelle et al.

[11] Patent Number: 5,917,005
[45] Date of Patent: Jun. 29, 1999

[54] POLYETHERIMIDES WITH RESISTANCE TO HIGH TEMPERATURES

[75] Inventors: Daniel Joseph Brunelle, Burnt Hills, N.Y.; Tina Lynn Grubb; Gordon Lee Tullos, both of Hattiesburg, Miss.

[73] Assignee: General Electric Company, Schenectady, N.Y.

[21] Appl. No.: 08/893,596

[22] Filed: Jul. 14, 1997

[51] Int. Cl.$^6$ .................................................... C08G 73/10
[52] U.S. Cl. ........................................... 528/353; 528/350
[58] Field of Search .............................................. 528/353

[56] References Cited

U.S. PATENT DOCUMENTS

| | | | |
|---|---|---|---|
| 4,443,591 | 4/1984 | Schmidt et al. | 528/128 |
| 5,189,115 | 2/1993 | Melquist et al. | 525/420 |
| 5,608,013 | 3/1997 | Matsuura et al. | 525/427 |

FOREIGN PATENT DOCUMENTS

| | | |
|---|---|---|
| 0336998 | 5/1988 | European Pat. Off. . |

OTHER PUBLICATIONS

Ulery et al., "Highly Soluble Polyimides from Sterically Hindered Diamines", *Polym. Prep.*, 38, 182–3 (1997).

*Primary Examiner*—Ana Woodward
*Attorney, Agent, or Firm*—Noreen C. Johnson; Douglas E. Stoner

[57] ABSTRACT

Polyetherimides are prepared by conventional means from hindered diamines such as the isomeric methyl-4,6-diethyl-1,3-phenylenediamines and bis(2-chloro-4-amino-3,5-diethylphenyl)methane. They have unusually high glass transition temperatures.

6 Claims, No Drawings

POLYETHERIMIDES WITH RESISTANCE TO HIGH TEMPERATURES

BACKGROUND OF THE INVENTION

This invention relates to polyetherimides. More particularly, it relates to polyetherimides having extremely good resistance to high temperatures.

Polyetherimides are well known commercially available polymers having advantageous properties including thermal oxidative resistance, good mechanical strength, excellent electrical properties and good chemical resistance. Commercially available polyetherimides include those of the type which may be prepared by the reaction of such aromatic amines as m- and p-phenylenediamine with bis(ether anhydrides) such as 2,2-bis[4-(3,4-dicarboxyphenoxy) phenyl]propane dianhydride, hereinafter sometimes designated "BPADA" for brevity. Their temperature stability is high, as shown by a glass transition temperature in the range of 215–220° C.

It is of interest, however, to prepare polyetherimides having still better resistance to high temperatures. Glass transition temperatures above 250° C. would be especially desirable.

SUMMARY OF THE INVENTION

The present invention provides a genus of polyetherimides having extremely good resistance to high temperatures. The glass transition temperatures of these new polymers typically range from about 250° C. to as high as 300° C.

In one of its aspects, the invention is directed to polyetherimides comprising structural units of the formula

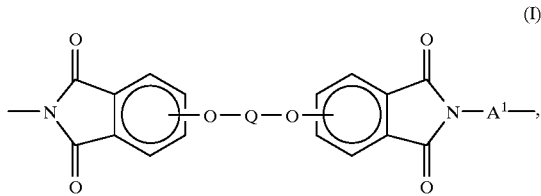

wherein Q is a divalent aliphatic or aromatic radical and $A^1$ is a divalent radical of the formula

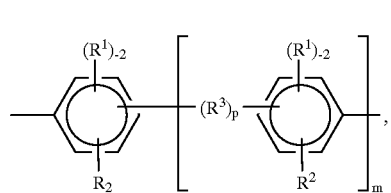

wherein $R^1$ is an alkyl radical having from 2 to about 10 carbon atoms, each $R^2$ is independently $C_{1-6}$ alkyl or halo, $R^3$ is $C_{1-3}$ gem-alkylene and each of m and p is independently 0 or 1.

Another aspect of the invention is copolyetherimides comprising structural units of formula I and units of the formula

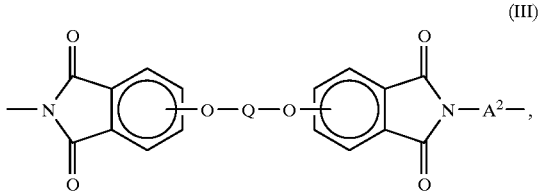

wherein Q is as previously defined and $A^2$ is m- or p-phenylene or a bis(alkylene)polydiorganosiloxane radical or has the formula

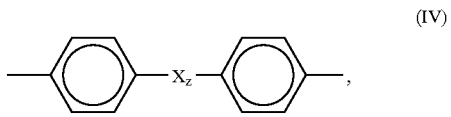

wherein X is O, S or $NR^4$, z is 0 or 1 and $R^4$ is hydrogen or $C_{1-6}$ alkyl.

DETAILED DESCRIPTION; PREFERRED EMBODIMENTS

The preferred Q radical in the polyetherimides of this invention has the formula

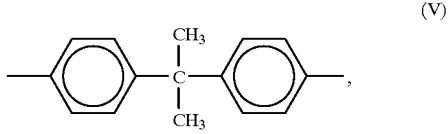

which may be considered as being derived from BPADA (preferably) or its 2,3-isomer.

The $A^1$ radical has formula II in which each $R^1$ value is an alkyl radical having from 2 to about 10 and preferably 2–3 carbon atoms. Ethyl radicals are most preferred. The $R^2$ values are $C_{1-6}$ alkyl or halo, especially methyl or chloro. $R^3$, when present, is a $C_{1-3}$ gem-alkylene radical; that is, one in which both free valence bonds are attached to the same carbon atom. It is preferably methylene.

As will be apparent from formula II, the $A^1$ radical may be monocyclic (m is 0) or bicyclic (m is 1). Further, the free valence bonds (or the single free valence bond and the bond connected to $R^3$) may be in the para or meta positions.

The preferred $A^1$ radicals are, first, the two isomeric structures in which m is 0, the $R^1$ radicals are ethyl in the 4- and 6-positions, $R^2$ is methyl in the 2- or 5-position, and the free valence bonds are in the 1- and 3-positions, and second, the structure in which m and p are each 1, each $R^1$ is ethyl in an ortho-position to the free valence bonds, $R^2$ is chloro, $R^3$ is methylene and the bonds connected to $R^3$ are in the para positions from the free valence bonds.

These radicals correspond to the diamines having the respective formulas

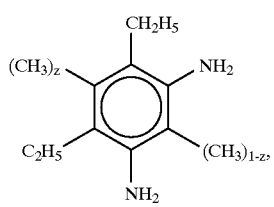

(VI)

wherein z is 0 or 1, and

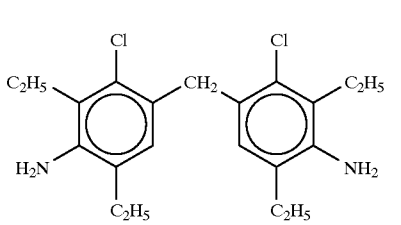

(VII)

Said diamines are respectively the two isomeric methyl-4,6-diethyl-1,3-phenylenediamines (singly or in admixture) and bis(2-chloro-4-amino-3,5-diethylphenyl)methane, which are respectively commercially available from Albemarle Corporation as "Ethacure 100" (mixture of isomers) and from Lonza Ltd. as "Lonzacure M-CDEA".

The polyetherimides of this invention include homopolyetherimides consisting of units of formula I. They also include copolyetherimides, a preferred class of which comprises such units in combination with units of formula III, wherein $A^2$ is a non-silicon-containing organic or bis(alkylene)polydiorganosiloxane radical or has formula IV. Suitable $A^2$ radicals include aromatic and especially $C_{6-20}$ aromatic radicals, as illustrated by m-phenylene, p-phenylene, bis(4-phenylene)methane and bis(4-phenylene) ether radicals, and aliphatic radicals, especially $C_{2-20}$ aliphatic radicals such as ethylene, trimethylene, hexamethylene and neopentylene. The aromatic radicals are generally preferred, and especially the m-phenylene and p-phenylene radicals; i.e., those present in m-phenylenediamine and p-phenylenediamine.

The proportion of units of formula I in the co polyetherimides of this invention is preferably sufficient to produce a polyetherimide having a glass transition temperature of at least about 230° C. About 10–90 mole percent of units of formula I is typical, with about 40–60 mole percent often being preferred.

The polyetherimides of this invention may be prepared by conventional methods, conducted under art-recognized conditions. One generally applicable method is the reaction of at least one appropriate diamine with at least one tetracarboxylic acid or dianhydride or other functional derivative (e.g., tetrahalide) thereof. Preparation may also be by the reaction of at least one bisphenol salt, typically the disodium salt, with at least one appropriate bis(halo- or nitro phthalimide), most often in a solvent of low polarity and in the presence of a thermally stable phase transfer catalyst such as a hexaalkylguanidinium halide.

The preparation of the polyetherimides of this invention is illustrated by the following examples. Molecular weights are weight average and were determined by gel permeation chromatography.

EXAMPLE 1

Anhydrous bisphenol A disodium salt was prepared by the reaction of bisphenol A with an equimolar proportion of 50% aqueous sodium hydroxide solution followed by removal of water by azeotropic distillation in xylene.

"Ethacure 100" diamine (17.83 g, 100 mmol) was added in a nitrogen atmosphere to a solution of 36.51 g (200 mmol) of 4-chlorophthalic anhydride in 200 ml of o-dichlorobenzene at 135° C. The solution turned brown and then became colorless when the addition was complete. About 20 mg of 4-dimethylaminopyridine was added as a catalyst and the solution was heated at 165° C. for 1 hour and under reflux for 3 hours. High pressure liquid chromatographic analysis indicated disappearance of the reactants with formation of four isomeric products. The solution was concentrated to about 100 ml, cooled and poured into petroleum ether, affording the desired bis(chlorophthalimide) mixture in 85% yield.

A 50-ml 3-necked flask was oven dried, transferred to a nitrogen dry box and charged with 2.764 g (10.15 mmol) of anhydrous bisphenol A disodium salt and 5.074 g (10 mmol) of the above-prepared bis(chlorophthalimide) mixture. The flask was capped and fitted with a condenser, nitrogen introduction means and mechanical stirrer. o-Dichlorobenzene, 30 ml, was added and the mixture was heated to reflux and about 5 ml of solvent removed by distillation. Hexa-n-propylguanidinium chloride, 175 mg (0.5 mmol), was added over one minute in solution in about 1 ml of o-dichlorobenzene, whereupon a vigorous exothermic reaction occurred with dissolution of solids and thickening of the solution. The mixture was sampled and analyzed periodically. When molecular weight growth was complete, the reaction was quenched with acetic acid and cooled to room temperature.

The product solution was diluted with methylene chloride, washed with 3% aqueous hydrochloric acid solution and water several times and vacuum stripped to remove methylene chloride. The product polyetherimide was then isolated by precipitation into methanol and filtration. It had a weight average molecular weight of 137,500 and a glass transition temperature of 295° C. after a 15-minute reaction. The molecular weight after a 5-minute reaction was 112,000.

EXAMPLE 2

The procedure of Example 1 was repeated, substituting anisole for the o-dichlorobenzene as solvent. After reaction periods of 5, 15 and 30 minutes, the product polyetherimides had weight average molecular weights of 24,000, 81,000 and 112,000, respectively.

EXAMPLE 3

The procedure of Example 1 was repeated, using a mixture containing equimolar proportions of the mixed bis(chlorophthalimides) employed in Example 1 and the bis(chlorophthalimide) of m-phenylenediamine. After 5 and 15 minutes of reaction, the product copolyetherimides had weight average molecular weights of 85,000 and 102,000, respectively.

EXAMPLE 4

A round-bottomed flask equipped with a mechanical stirrer and a nitrogen purge line was charged with 10.238 g (19.671 mmol) of BPADA, 3.507 g (19.671 mmol) of "Ethacure 100" diamine and 44 ml of N-methylpyrrolidone. The mixture was stirred for 24 hours under nitrogen, after which 20 ml of xylene was added and the mixture was heated at 180° C. for 10 hours. The resulting polyetherimide was precipitated into methanol, filtered, washed with methanol and dried under vacuum. It had a molecular weight of 54,100.

EXAMPLE 5

The procedure of Example 4 was repeated, using a mixture containing equimolar proportions of "Ethacure 100" diamine and m-phenylenediamine. A corresponding copolyetherimide was obtained.

EXAMPLE 6

The procedure of Example 1 was repeated, substituting "Lonzacure M-CDEA" diamine for the "Ethacure 100" diamine on an equimolar basis. The resulting polyetherimide had a glass transition temperature of 252° C.

EXAMPLE 7

The procedure of Example 4 was repeated, substituting "Lonzacure M-CDEA" diamine for the "Ethacure 100" diamine on an equimolar basis. A similar product was obtained.

What is claimed is:

1. A polyetherimide comprising structural units of the formula

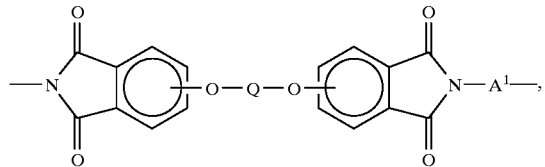

(I)

wherein Q is a divalent aliphatic or aromatic radical and $A^1$ is a divalent radical of the formula

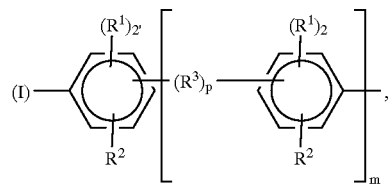

wherein $R^1$ is an alkyl radical having from 2 to about 10 carbon atoms, each $R^2$ is independently $C_{1-6}$ alkyl or halo, $R^3$ is $C_{1-3}$ gem-alkylene and each of m and p is independently 0 or 1.

2. A polyetherimide according to claim 1 comprising structural units of the formula.

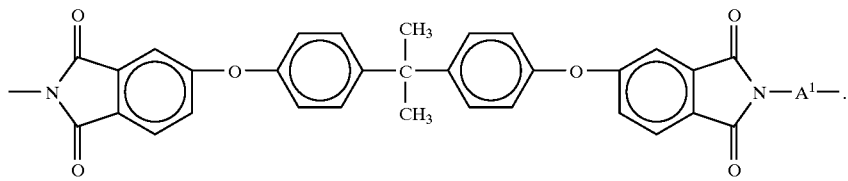

3. A polyetherimide according to claim 1 wherein $A^1$ has the formula

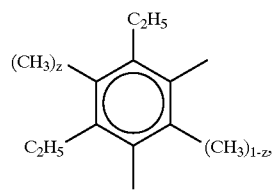

wherein z is 0 or 1.

4. A polyetherimide according to claim 3 comprising structural units of the formula

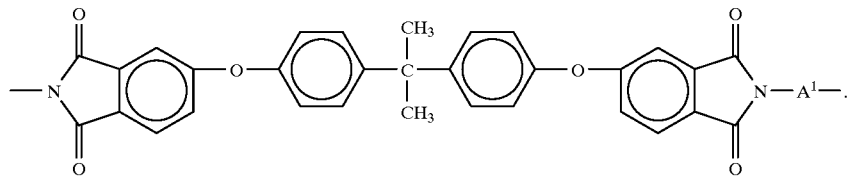
5. A polyetherimide according to claim 1 wherein $A^1$ has the formula
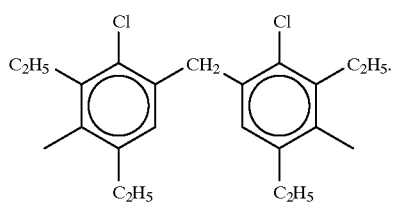
6. A polyetherimide according to claim 5 comprising structural units of the formula
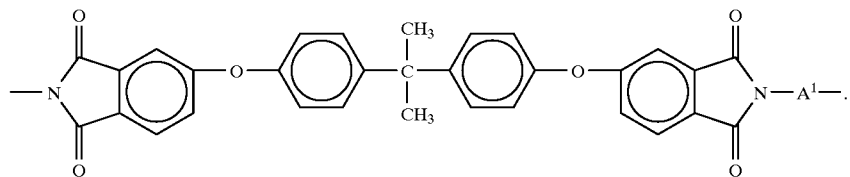
* * * * *

UNITED STATES PATENT AND TRADEMARK OFFICE
CERTIFICATE OF CORRECTION

PATENT NO. : 5,917,005

DATED : June 29, 1999

INVENTOR(S) : Daniel Joseph Brunelle, et al

It is certified that error appears in the above-identified patent and that said Letters Patent is hereby corrected as shown below:

Column 3, starting at line 2, please change as follows:

From:

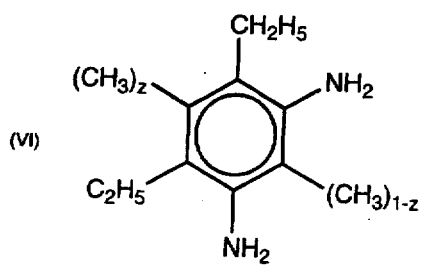

To:

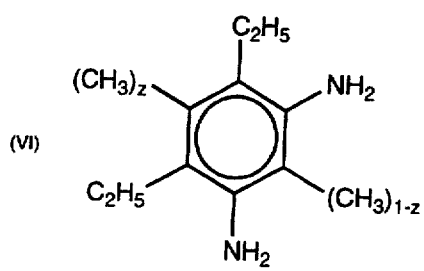

Signed and Sealed this

Seventeenth Day of October, 2000

Attest:

Q. TODD DICKINSON

*Attesting Officer*  *Director of Patents and Trademarks*